United States Patent [19]
Knockeart

[11] Patent Number: 5,552,780
[45] Date of Patent: Sep. 3, 1996

[54] METHOD AND APPARATUS FOR TRANSMITTING CODED LIGHT THROUGH LOW TRANSMISSIBLE MATERIALS

[75] Inventor: Ronald P. Knockeart, Clarkston, Mich.

[73] Assignee: Siemens Automotive Corporation, Auburn Hills, Mich.

[21] Appl. No.: 401,318

[22] Filed: Mar. 9, 1995

[51] Int. Cl.⁶ .................................................. G08G 1/123
[52] U.S. Cl. .................. 340/991; 340/531; 359/154; 359/159; 359/176; 359/174; 455/41
[58] Field of Search ..................... 340/991, 980, 340/555, 531; 359/141, 162, 143, 144, 145, 172, 173, 174, 176, 177, 159, 174, 176, 154; 455/95, 96, 97, 11.1, 56.1, 41, 617

[56] References Cited

U.S. PATENT DOCUMENTS

| | | | |
|---|---|---|---|
| 4,325,146 | 4/1982 | Lennington | 455/604 |
| 4,980,926 | 12/1990 | Noetzel | 359/144 |
| 5,060,308 | 10/1991 | Bieback | 359/142 |
| 5,241,410 | 8/1993 | Streck et al. | 359/176 |

FOREIGN PATENT DOCUMENTS 0194618  8/1989  Japan ...................................... 455/95

Primary Examiner—John K. Peng
Assistant Examiner—Benjamin C. Lee
Attorney, Agent, or Firm—Russel C. Wells

[57] ABSTRACT

A transceiver for transmitting and receiving coded light through a motor vehicle windshield from an in-vehicle computer. The coded light is binary encoded data that is first transmitted through the windshield by light emitting diodes in the red, green, or yellow light range or a similar light range that is not attenuated by the windshield. A photo diode receives the transmitted encoded light and operates a transistor switch amplifier means to activate one or more infrared light emitting diodes connected in parallel. A power supply comprising a light source on the inside of the vehicle and a solar cell on the outside of the windshield provides the necessary power to activate the circuitry on the outside of the windshield. The complete unit is mounted on the windshield in an area which is out of the driver's normal vision.

23 Claims, 2 Drawing Sheets

METHOD AND APPARATUS FOR TRANSMITTING CODED LIGHT THROUGH LOW TRANSMISSIBLE MATERIALS

This invention relates to infra red light transmission and receiving and more particularly coupling data carried by infra red light through a motor vehicle windshield from a data source on one side to a transmitter on the other side of the windshield.

BRIEF SUMMARY OF INVENTION

Background of Invention

There are fundamentally two different types of vehicle navigational systems. The first system makes use of stored map displays wherein the maps of a predetermined area are stored in the in-vehicle computer and displayed to the vehicle operator or driver. The maps, knowing the location where the vehicle started and where it is to go, will highlight the direction and the driver will have to read the display and follow the route. One such stored map display system offered by General Motors on their 1994 Oldsmobile, uses Global Positioning System (GPS) satellites and advanced dead reckoning techniques to determine a precise location. The driver enters details of the desired destination into an on-board or in-vehicle, computer in the form of specific address, a road intersection, etc. The stored map is displayed and the operator then pinpoints the desired destination. The on-board computer then calculates the most efficient route. The on-board computer then displays on a display unit, the distance to and the direction of each turning maneuver in easy-to-read graphics and also includes a voice prompt.

The second system, such as the Siemens Ali-Scout™ system, requires that the driver key-in the destination address coordinates into the in-vehicle computer. A compass means located in the vehicle then gives a "compass" direction to the destination address. Such a "compass" direction is shown in easy-to-read graphics as an arrow on a display unit indicating the direction the driver should go. Along the side of the road are several infrared beacon sites which transmit data information to the properly equipped vehicle relative to the next adjacent beacon site. From all of the in-vehicle signals received, the in-vehicle computer selects the desired beacon data information to the next beacon and displays a graphic symbol for the vehicle operator to follow and the distance to the desired destination. There is no map to read, only a simple graphic symbol and a voice prompt telling the vehicle operator when to turn and when to continue in the same direction.

U.S. Pat. No. 4,350,970, assigned to Siemens AG and issued on Sep. 21, 1982 to von Tomkewitsch and entitled "Method for Traffic Determination in a Routing and Information System for Individual Motor Vehicle Traffic" describes a method for traffic management in a routing and information system for motor vehicle traffic. The system has a network of stationary routing stations each located in the vicinity of the roadway which transmit route information and local information concerning its position to passing vehicles. The trip destination address is loaded by the vehicle operator into an onboard device in the vehicle and by dead reckoning techniques a distance and direction graphic is displayed. The first routing station which the vehicle passes transmits a message to the vehicle with route data to the next routing station. The vehicle receives the message and as it executes the several vector distances in the message it accumulates time and distance which it transmits to the second routing station when it is interrogated by the second routing station. In this manner, traffic management is updated in real time and the vehicles are always routed the "best way". Of course the best way may be the shortest way, the less traveled way, the cheapest way or any combination of these plus other criteria.

SUMMARY OF INVENTION

The Siemens Ali-Scout™ system uses infra-red light transmission between beacon sites placed alongside of the roadway and the motor vehicle. Route vectors, travel times, and other data are transmitted to the vehicle and travel times and other data are transmitted from the vehicle.

While IR transmission is very localized and avoids interference with other messages as is present with RF transmission, the signal attenuates when it passes through certain media such as glass. In most motor vehicles, the glass is not clear and includes certain dopants which are added during glass manufacture to screen out undesirable rays such as sun rays in the IR region while permitting other light rays to pass unattenuated. The reason for this is to reduce the heating effect and the subsequent load placed on the air conditioning systems of the vehicle. Unfortunately in order to conserve energy from the motor vehicle electrical and power system, the manufacture of glass requires more and more dopants to be added.

There is disclosed herein a transceiver for transmitting and receiving coded light through low transmissible materials such as a motor vehicle windshield the coded light representing data. The transceiver comprises a first means for receiving outgoing binary encoded data to be transmitted through the windshield. A transmitter is located on the inside of the windshield for transmitting the outgoing data through the windshield. Positioned on the other side of the windshield is a first receiver-transmitter which is responsive to the outgoing data from the transmitter. A second receiver-transmitter is located on the other side of the windshield and is responsive to the light signals containing incoming binary-encoded data. A receiver is located on the inside of the windshield and is responsive to the second receiver-transmitter receiver for receiving the incoming data. A power activator means located on the inside of the windshield activates a power supply means on the other side of the windshield. The power supply means is responsive to the power activation means for activating both the first and second receiver-transmitters. A second means is located on the inside of the windshield for receiving the incoming binary encoded data transmitted through the windshield and is coupled to the receiver. A gate means for selecting either the transmitter or the receiver and is operable to selectively couple the transmitter or receiver to the first or second means.

It is a principle advantage of the present system to provide a method of amplifying the IR signals from the in-vehicle computer after they pass through the windshield and are being transmitted to a beacon site and to prepare the signals received from the beacon site prior to being transmitted through the windshield to the in-vehicle computer to avoid further attenuation.

It is another advantage of the present system to provide a small and simple module or unit to mount on the windshield of the motor vehicle which provides the necessary preparation circuit to accomplish the transmission and receiving of the infra red IVHS signals.

These and other advantages will become apparent from the following drawings and detailed description of the preferred embodiment of the present invention.

DETAILED DRAWINGS

In the drawings:

FIG. 1. is a sketch of typical light transmission curve;

FIG. 2, is a block diagram of the transceiver unit according to the preferred embodiment;

FIG. 3. is a schematic of a sending unit according to the preferred embodiment; and FIG. 4. is a schematic of a receiving unit according to the preferred embodiment.

DETAILED DESCRIPTION

Figure 1:
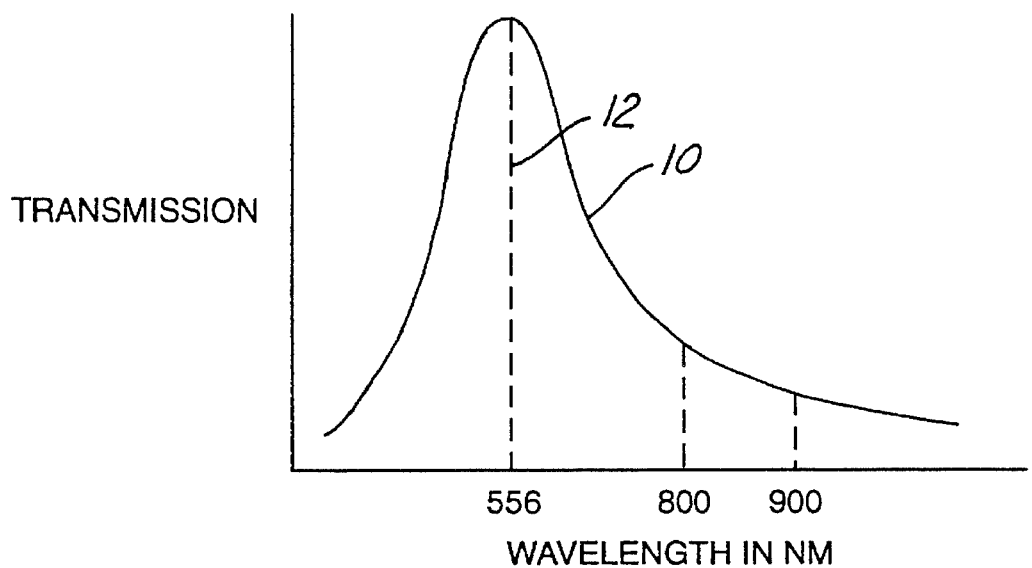

FIG. 1 illustrates a typical light transmission curve 10. As noted the low signal transmission of IR frequencies is encountered with wavelength above 800 nm. Typically IR light diodes operate between 800 and 950 nm. The center 12 of the curve 10 is the wavelength of visible light which peaks at about 556 nm. Windshields are designed to transmit, unattenuated, light around this value. Solar glass is designed to block the non-visible rays from being transmitted. IR light rays are at or beyond the range of admitted light.

As the distance between the sender and receiver increases and due to the low signal transmission, the problem of correctly decoding the information being transmitted by the beacon site and received by the in-vehicle computer 14 is increased. The power of the IR light wave varies inversely as the square of the distance traveled. Conversely, doubling the number of light emitting diodes will increase the signal strength by the square root of the number of parallelly coupled diodes. Therefor, one method, which is much more expensive, is to add more transmitter IR emitting diodes in both stations, the vehicle and the beacon site, to increase the signal strength, but cost and physical limitations work to make this additional approach very unfavorable.

In the Siemens Ali-Scout™ system, the data is transmitted in the infrared region in digital format from the beacon site to the vehicle and from the vehicle to the beacon site. Signal transmission has a time for transmitting from the beacon and a time for transmitting from the vehicle. One function of the in-vehicle computer 14 is to differentiate between the two times; i.e. there is a first means in the computer for receiving outgoing binary encoded data to be transmitted through the windshield and a second means for receiving the incoming binary encoded data transmitted through the windshield.

Figure 2:
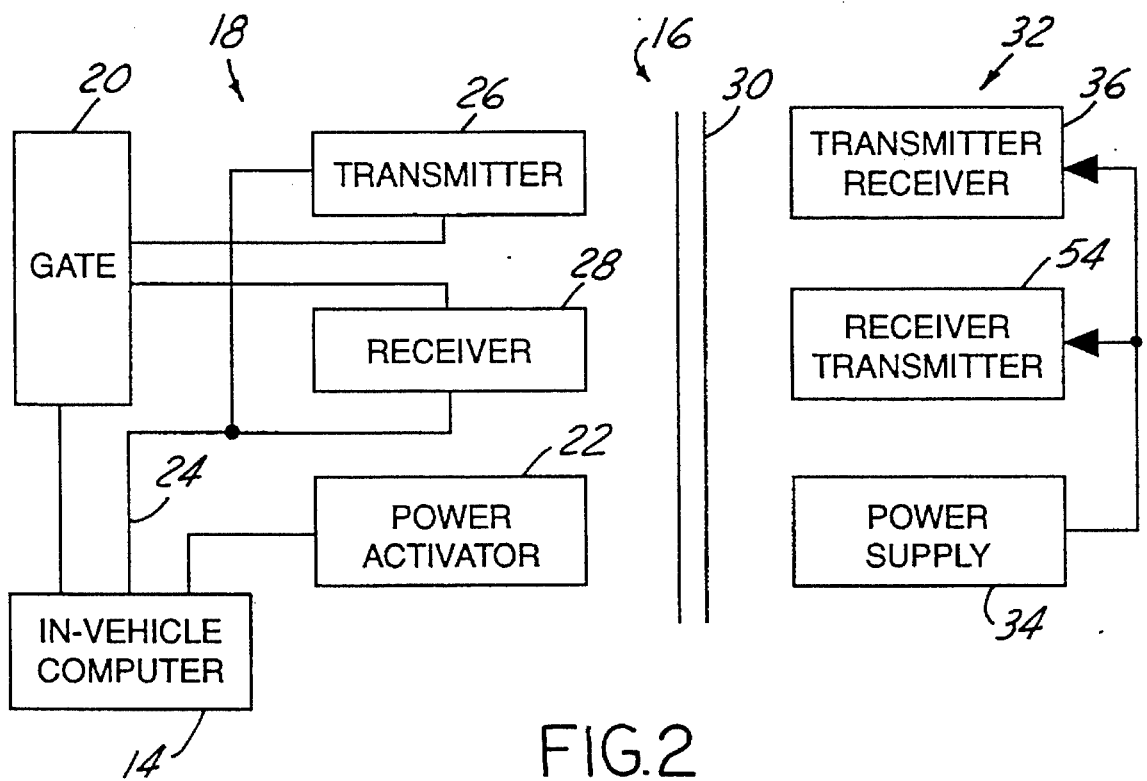

FIG. 2 is a block diagram of the preferred embodiment of the transceiver unit 16 of the present invention. On the left side of the diagram, which represents the in-vehicle portion of the system 18, there is found the in-vehicle computer 14 which controls the operation of the Siemens Ali-Scout™ system in the vehicle. As far as the preferred embodiment is concerned, the in-vehicle computer 14 activates the gate means 20 to control the sending or receiving of information, the activation of the power activator 22 and the connection of the data path 24 from the computer to either the transmitter 26 or the receiver 28.

In the middle of FIG. 2 there is illustrated a medium 30 such as a windshield glass through which the data information passes. If the medium 30 is a conventional automotive windshield glass, the manufacturer of the glass has implanted several dopants so as to allow substantially unattenuated light of some wave lengths around the mid point 12 of the curve 10 in FIG. 1, but reject the energy wavelengths beyond these desired wavelengths. Since most traffic signals are red, and green, both of these colors, as represented by their respective wavelengths, will pass through the glass 30 unattenuated.

At the right side of FIG. 2, is the out-of-vehicle portion 32 of the system of the present embodiment. This portion, when it functions as a receiver, receives the infrared signals from the beacon site, amplifies the signal and prepares to transmit or couple the resulting signal through the medium 30. Since it is inappropriate to have a physical connection between both sides of the windshield, in the preferred embodiment transmission across the medium 30 is by means of light energy which can be a green or red emitting diode or some similar color. In the out-of-vehicle portion of the module, there is a power supply 34 to power the circuitry. One such power supply 34 may be a rechargeable battery that is maintained by a trickle charge system means activated by the power activator means 22. In the preferred embodiment, this includes a light source in the vehicle and solar cell and circuitry means for providing a trickle charge to the battery.

Figure 3:
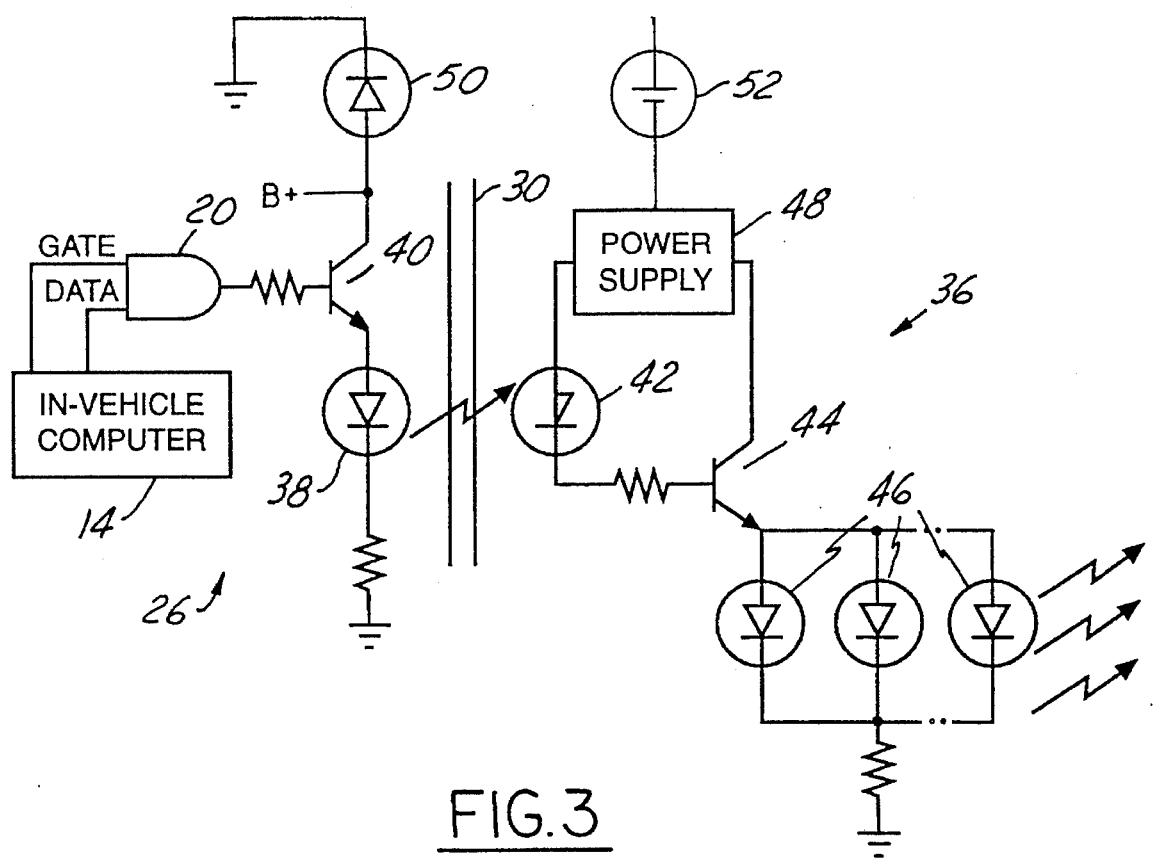

FIG. 3 is a diagrammatic schematic of the preferred embodiment of the present invention of the transmitting system, the unit for sending data from the vehicle to the beacon site. This is shown on both sides of the windshield 30. In this embodiment, the inside unit is a transmitter 26 and the out-of-vehicle unit is a first receiver-transmitter unit 36. The in-vehicle computer 14 supplies the data to be sent to the beacon site and controls the gate means 20 which functions to activate the in-vehicle transmitter 26 to transmit the data through the medium 30. As illustrated the gate means 20 is a switch for activating a light emitting diode 38. As stated above, the method of transmitting the data is via light energy and since the windshield is transparent to red or green, the light emitting diode 38 may be either one of these or any similar color. The combination of the output signal from the gate means 20, illustrated as an operational amplifier, drives a transistor switch amplifier means 40 or amplifier to turn the light emitting diode 38 on or off. The light emitting diode 38 has a color selected from the group which passes unattenuated through the windshield. Typical colors are red, green or yellow.

Placed opposite the light-emitting diode 38 is a photo diode 42 responsive to the light range of the light emitting diode 38. This photo diode 42 supplies base current to a switch means 44 controlling the operation of one or more infra red light emitting diodes 46. As previously stated, by placing two or more light emitting diodes 46 in parallel, the light energy is increased by the square root of the number of the diodes.

While the transmission from out-of-the vehicle to and from the beacon sites is in the infrared (IR) range, the transmission through the windshield 30 can be in the visible light range which is not as attenuated by the windshield as the infra red light would be. As explained above, the information is both sent and received by the vehicle, but to avoid any interference, the gate means 20 functions to operate the transceiver 16 in either mode. The infrared light emitted from the infra red light emitting diode or diodes 46, functioning as a transmitter, is transmitted to the beacon site unaffected by the attenuation of the windshield 30.

In order to provide the appropriate power to this receiver-transmitter unit 36, a power supply 48 is provided having a suitable light source 50 of the proper wavelength on the inside of the vehicle and mounted directly opposite on the outside of the windshield 30 is a solar cell 52 supplying the power supply 48 providing the necessary power to the receiver-transmitter unit 26.

Figure 4:
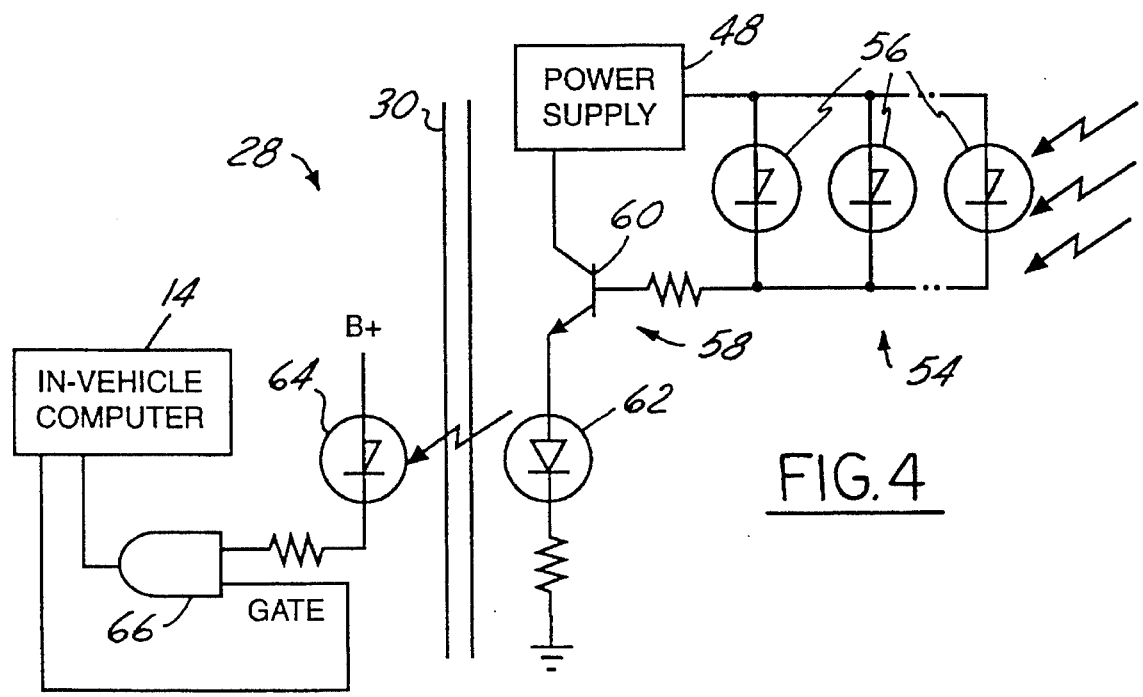

FIG. 4. is a schematic of the vehicle receiver 28 and a second receiver-transmitter unit 54 of the preferred embodiment. In this embodiment, the beacon site transmits an IR signal which is received by the vehicle. The device that receives the signal is a IR responsive photo diodes 56 functioning as a receiver that supplies an input through a second gate 58 means to the power transistor 60 supplying a light emitting diode 62. The gate means 20 inside the vehicle functions to select the sending or receiving mode of the device 16. In this device the light emitting diode 62, which again operates in the visible light range such as red, green or yellow, is functioning as a transmitter to transmit the data carried by the IR signal through the windshield 30.

Opposite the light emitting diode 62 and on the inside of the glass 30 is a second receiver photo diode 64, functioning as a receiver, which is activated by the light emitting diode 62 on the outside of the windshield. The output of the second receiver photo diode 64 is supplied through a fourth gate means 66, again to distinguish the modes to activate the in-vehicle computer 14.

As illustrated in both FIGS. 3 and 4, there is illustrated several channels of light being transmitted and received. The purpose of these several channels is to make sure that the power being transmitted to the beacon site is strong enough to activate the beacons. The portion of the device which is coupling the signals through the windshield needs only one channel to supply sufficient light energy to power the infrared channels transmitting and receiving the infrared signals from the beacon sites. Both the sending array and receiving array including the solar cell power supply 52, 48 are contained in a module that is capable of being mounted to the windshield 30 typically at the top and generally behind the rear view mirror or at the bottom where it does not affect the vision of the vehicle operator. On the inside of the vehicle the device 26, 28 or module is 'hard wired' to the in-vehicle computer 14.

There has thus been described an apparatus for a method for transmitting and receiving coded light representing data through low transmissible materials such as a motor vehicle windshield. The method comprises the steps of first selecting to either transmit or receive data. Then if transmitting, receiving the outgoing data from a computer to be transmitted through the windshield. A power supply on the other side of the windshield is activated from inside the vehicle and is used for energizing the receiving and transmitting means located there. Next the outgoing data is transmitted through the windshield. A first receiving means is on the other side of the windshield to receive the outgoing data and transmitting the outgoing data from the vehicle in the infrared spectrum to beacon sites. A second receiving means is also on the other side of the windshield to receive the incoming binary-encoded data from beacon sites. Next, the incoming binary-encoded data is transmitted through the windshield. A third receiving means is located on the inside of the windshield to receive the incoming data. The incoming binary-encoded data transmitted through the windshield is then connected to the computer for storing the incoming data therein.

What is claimed is:

1. A transceiver for transmitting and receiving coded light through low transmissible material including a motor vehicle windshield, the coded light representing data communicated between a remote external destination and an in-vehicle computer, the transceiver comprising:

first means on the inside of the windshield for receiving outgoing binary-encoded data from the in-vehicle computer to be transmitted through the windshield;

a transmitter on the inside of the windshield operatively coupled to said first means for converting and transmitting coded light representing said outgoing data through the windshield;

a first receiver-transmitter on the other side of the windshield responsive to said outgoing coded light from said inside transmitter to transmit outgoing encoded light signal to said remote destination;

a second receiver-transmitter on said other side of the windshield responsive to light signals communicated from said remote destination containing incoming binary-encoded data for transmitting light signals containing said incoming binary-encoded data through said windshield;

a receiver on the inside of the windshield responsive to said second receiver-transmitter transmitted light signals for receiving said transmitted light signals containing said incoming data;

a power activator means on the inside of the windshield for transmitting an activation light signal through said windshield;

a power supply means on said other side of the windshield, said power supply means responsive to said activation light signal of said power activator means for activating said first and second receiver-transmitters;

second means coupled to said inside receiver for receiving said incoming binary encoded data; and gate means for selecting between said inside transmitter and said inside receiver and operable to selectively couple said selected inside transmitter or inside receiver to said first or second means.

2. A transceiver for transmitting and receiving coded light through low transmissible materials including a motor vehicle windshield according to claim 1 wherein said power activator means comprises a light source and said power supply means comprising solar cell means responsive to said light source to generate power to activate said first and second receiver-transmitters.

3. A transceiver for transmitting and receiving coded light through low transmissible materials including a motor vehicle windshield according to claim 1 wherein said inside transmitter comprises a transistor switch amplifier means responsive to said gate means for operating said switch amplifier means in accordance with the binary value of the outgoing binary-encoded data and at least one light emitting diode having light wavelength that passes through the low transmissible material substantially unattenuated, said light emitting diode operatively connected to said switch amplifier means.

4. A transceiver for transmitting and receiving coded light through low transmissible materials including a motor vehicle windshield according to claim 3 wherein said at least one light emitting diode has a frequency color selected from the group consisting of red, green or yellow.

5. A transceiver for transmitting and receiving coded light through low transmissible materials including a motor vehicle windshield according to claim 3 wherein the receiver portion of said first receiver-transmitter has a photo diode means responsive to said at least one light emitting diode in said inside transmitter and the transmitter portion of said first receiver-transmitter having, at least one infrared light emitting diode, and a switch means coupled to said power supply means and responsive to said photo diode means for supplying current from said power supply to said at least one infrared light emitting diode.

6. A transceiver for transmitting and receiving coded light through low transmissible materials including a motor vehicle windshield according to claim 1 wherein the transmitter portion of said second receiver-transmitter has a light emitting diode means, the receiver portion of said second receiver-transmitter has at least one infrared responsive diode, and a second switch means coupled to said power supply means and responsive to said at least one infrared responsive diode for supplying current to said light emitting diode means for generating light signals through the windshield to said inside receiver.

7. A transceiver for transmitting and receiving coded light through low transmissible materials including a motor vehicle windshield according to claim 6 wherein said inside receiver comprises a photo diode means operatively connected to said gate means and responsive to the light signals generated by said light emitting diode means containing incoming binary-encoded data.

8. A transceiver for transmitting and receiving coded light through low transmissible materials including a motor vehicle windshield according to claim 6 wherein said at least one light emitting diode has a frequency color selected from the group consisting of red, green or yellow.

9. A method for transmitting and receiving coded light data between a computer inside a vehicle and a remote external destination through low transmissible materials including a motor vehicle windshield, the coded light representing data, comprising the steps of:

selecting to either transmit or receive data on the inside of the windshield;

receiving from the computer outgoing binary-encoded data to be transmitted through the windshield;

transmitting light signals containing the outgoing data through the windshield upon selecting to transmit;

activating a power supply means on the other side of the windshield for energizing receiving and transmitting means on said other side of the windshield;

receiving on the other side of the windshield the light signals containing said outgoing data;

transmitting the outgoing data to said destination in the infrared spectrum;

receiving on said other side of the windshield light signals containing incoming binary-encoded data from said destination;

transmitting light signals containing the incoming binary-encoded data through the windshield;

receiving the light signals containing incoming binary-encoded data transmitted through the windshield; and then storing the incoming binary-encoded data in the computer.

10. A method for transmitting coded light data between a computer means in a vehicle and a remote external destination through low transmissible materials including a motor vehicle windshield, the coded light representing data, comprising the steps of:

receiving from the computer outgoing binary-encoded data to be transmitted through the windshield;

transmitting light signals containing the outgoing data through the windshield;

activating a power supply means on the other side of the windshield for energizing receiving means on said other side of the windshield;

receiving on the other side of the windshield the light signals containing said outgoing data; and then transmitting light signals containing the outgoing data to said destination.

11. In the method for transmitting coded light data according to claim 10 wherein in the step of transmitting through the windshield, the light signals are in a frequency color selected from the group consisting of red, green or yellow.

12. In the method for transmitting coded light data according to claim 11 wherein in the step of transmitting the outgoing data, the light signals are in the infrared spectrum.

13. A method for receiving coded light data from a remote destination through low transmissible materials including a motor vehicle windshield, the coded light representing data to be stored in a computer means in a vehicle, comprising the steps of:

receiving on one side of the windshield light signals containing incoming binary-encoded data from said destination;

transmitting light signals containing the incoming binary-encoded data through the windshield;

receiving the light signals containing incoming binary-encoded data transmitted through the windshield; and then storing the incoming binary-encoded data in the computer means in the vehicle.

14. In the method for receiving coded light data according to claim 13 wherein in the first step of receiving, the light signals are in the infrared spectrum.

15. In the method for receiving coded light data according to claim 13 wherein in the step of transmitting through the windshield, the light signals are in a frequency color selected from the group consisting of red, green or yellow.

16. A transmitter for transmitting coded light data between a computer means in a vehicle and a remote external destination through low transmissible materials including a motor vehicle windshield, the coded light representing data, comprising:

first means on the inside of the windshield for receiving from the computer means outgoing binary-encoded data to be transmitted through the windshield;

a first transmitting means operatively connected to said first means for transmitting light signals containing the outgoing data through the windshield;

a power activator means on the inside of the windshield for activating a power supply means on the other side of the windshield;

receiving means on said other side of the windshield activated by said power supply means for receiving the light signals containing said outgoing data; and a second transmitting means on said other side operatively connected to said receiving means for transmitting light signals containing said outgoing data to said destination.

17. In the transmitter according to claim 16 where in said first transmitting means through the windshield, comprises at least one light emitting diode in a frequency color selected from the group consisting of red, green or yellow.

18. In the transmitter according to claim 16 where in said second transmitting means, comprises at least one light emitting diode having a light frequency in the infrared spectrum.

19. In the transmitter according to claim 16 where in said receiving means has at least one photo diode operating in a frequency color selected from the group consisting of red, green or yellow.

20. A receiver for receiving coded light data from a remote destination through low transmissible materials including a motor vehicle windshield, the coded light representing data to be stored in a computer means in a vehicle, comprising:

first receiving means on one side of the windshield having at least one light photo diode for receiving light signals containing incoming binary-encoded data from said remote destination;

transmitting means operatively connected to said first receiving means for transmitting said light signals containing the incoming binary-encoded data through the windshield, said transmitting means having at least one light emitting diode;

second receiving means on the inside of the windshield for receiving the light signals containing incoming binary-encoded data transmitted through the windshield, said second receiving means comprising at least one photo diode responsive to the frequency of the light transmitted through the windshield; and means for operatively connected to said second receiving means for converting and transmitting the income binary-encoded data to a computer means in the vehicle.

21. In the receiver according to claim 20 wherein in said first receiving means, said at least one photo diode is responsive to the frequency of light in the infrared spectrum.

22. In the receiver according to claim 20 where in said transmitting means said at least one light emitting diode operates in a frequency color selected from the group consisting of red, green or yellow.

23. In the receiver according to claim 20 wherein said second receiving means said at least one photo diode operates in a frequency color selected from the group consisting of red, green or yellow.

* * * * *